(12) United States Patent
Fang et al.

(10) Patent No.: US 9,432,226 B2
(45) Date of Patent: Aug. 30, 2016

(54) CHANNEL EQUALIZATION METHOD AND APPARATUS, AND RECEIVER

(71) Applicant: Huawei Technologies Co., Ltd., Shenzhen, Guangdong (CN)

(72) Inventors: Yuanyuan Fang, Shenzhen (CN); Liangchuan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/922,861

(22) Filed: Oct. 26, 2015

(65) Prior Publication Data

US 2016/0050087 A1    Feb. 18, 2016

Related U.S. Application Data

(63) Continuation of application No. PCT/CN2013/074781, filed on Apr. 26, 2013.

(51) Int. Cl.
    *H04L 25/03*    (2006.01)
    *H04L 25/02*    (2006.01)
    *H04L 5/00*     (2006.01)

(52) U.S. Cl.
    CPC ....... *H04L 25/0391* (2013.01); *H04L 25/0256* (2013.01); *H04L 25/03006* (2013.01); *H04L 5/0048* (2013.01)

(58) Field of Classification Search
    CPC .................. H04L 25/0256; H04L 25/03006; H04L 25/0391; H04L 5/0048
    See application file for complete search history.

(56) References Cited

U.S. PATENT DOCUMENTS

| 2006/0203943 A1 | 9/2006 | Scheim et al. |
| 2008/0137788 A1 | 6/2008 | Bang et al. |
| 2008/0240308 A1 | 10/2008 | Lee et al. |
| 2009/0324223 A1 | 12/2009 | Liu |

FOREIGN PATENT DOCUMENTS

| CN | 1722623 A | 1/2006 |
| CN | 101404518 A | 4/2009 |

OTHER PUBLICATIONS

Takeshi Onizawa, et al., "A Simple Adaptive Channel Estimation Scheme for OFDM Systems", Vehicular Technology Conference, Sep. 19-22, 1999, p. 279-283.

Cheran Vithanage, et al., "Robust Linear Channel Estimation Methods for Per-Subcarrier Transmit Antenna Selection", IEEE Transactions on Communications, vol. 59, No. 7, Jul. 2011, p. 2018-2028.

Shih-Chan Huang, et al., "Novel Channel Estimation Techniques on SC-FDMA Uplink Transmission", 2010 IEEE Vehicular Technology Conference, May 16-19, 2010, 5 pages.

*Primary Examiner* — Ross Varndell

(57) ABSTRACT

Embodiments of the present invention provide a channel equalization method and apparatus, and a receiver. The method includes: acquiring a channel transfer matrix according to a training sequence sent by a transmit end; acquiring an amplitude response matrix of the channel transfer matrix, and acquiring, according to the amplitude response matrix, a window length of a sliding window that is required for performing noise filtering on the channel transfer matrix; and performing noise filtering on the channel transfer matrix according to the window length of the sliding window, and performing, according to a channel transfer matrix that is obtained by means of noise filtering, channel equalization on a data payload sent by the transmit end. The channel equalization method and apparatus, and a receiver provided in the embodiments of the present invention may implement adaptive channel equalization.

19 Claims, 5 Drawing Sheets

CHANNEL EQUALIZATION METHOD AND APPARATUS, AND RECEIVER

CROSS-REFERENCE TO RELATED APPLICATIONS

This application is a continuation of International Application No. PCT/CN2013/074781, filed on Apr. 26, 2013, which is hereby incorporated by reference in its entirety.

TECHNICAL FIELD

Embodiments of the present invention relate to communications technologies, and in particular, to a channel equalization method and apparatus, and a receiver.

BACKGROUND

A channel equalization technology (Channel equalization) refers to an anti-attenuation measure that is used to enhance transmission performance of a communications system in an attenuated channel. In the channel equalization technology, compensation is mainly performed on a channel feature or a feature of an entire transmission system, so as to eliminate or reduce a problem of intersymbol interference caused by a multipath delay in wideband communication.

In the prior art, signal equalization in an orthogonal frequency division multiplexing technology (Orthogonal Frequency Division Multiplexing, OFDM for short) is implemented based on a training sequence. At intervals of a fixed quantity of OFDM data payloads, a transmit end inserts a training sequence and sends an OFDM data payload inserted with a known training sequence to a receive end; correspondingly, the receive end receives the OFDM data payload inserted with the training sequence, and at intervals of a fixed quantity of OFDM data payloads, calculates a channel transfer matrix based on the training sequence for one time, and performs channel equalization on a data payload after the current training sequence according to the channel transfer matrix, so as to perform compensation and recovery on the data payload.

In the prior art, a channel transfer matrix obtained based on one group of training sequence has relatively large jitter due to impact of noise. Therefore, when it is assumed that subcarrier sequences are correlated with each other, for a channel transfer matrix obtained based on a current training sequence, mean noise filtering processing is performed between all subcarrier sequences according to a preset window length of a sliding window, and then channel equalization is performed. However, because other damage exists in a channel, mean noise filtering processing performed according to the preset window length of the sliding window may lead to inaccuracy of channel equalization thereof.

SUMMARY

Embodiments of the present invention provide a channel equalization method and apparatus, and a receiver, so as to implement adaptive channel equalization.

According to a first aspect, an embodiment of the present invention provides a channel equalization method, including:

acquiring a channel transfer matrix according to a training sequence sent by a transmit end;

acquiring an amplitude response matrix of the channel transfer matrix, and acquiring, according to the amplitude response matrix, a window length of a sliding window that is required for performing noise filtering on the channel transfer matrix; and performing noise filtering on the channel transfer matrix according to the window length of the sliding window, and performing, according to a channel transfer matrix that is obtained by means of noise filtering, channel equalization on a data payload sent by the transmit end.

With reference to the first aspect, in a first possible implementation manner of the first aspect, before the acquiring an amplitude response matrix of the channel transfer matrix, the method further includes:

performing, according to a preset window length of a noise prefiltering sliding window, noise prefiltering processing on the channel transfer matrix, and acquiring a channel transfer matrix that is obtained by means of noise prefiltering processing; and the acquiring an amplitude response matrix of the channel transfer matrix includes:

acquiring an amplitude response matrix of the channel transfer matrix that is obtained by means of noise prefiltering processing.

With reference to the first aspect or the first possible implementation manner of the first aspect, in a second possible implementation manner of the first aspect, the acquiring, according to the amplitude response matrix, a window length of a sliding window that is required for performing noise filtering on the channel transfer matrix includes:

acquiring an amplitude response cycle of the channel transfer matrix according to the amplitude response matrix; and acquiring, according to the amplitude response cycle, the window length of the sliding window that is required for performing noise filtering on the channel transfer matrix.

With reference to the second possible implementation manner of the first aspect, in a third possible implementation manner of the first aspect, the acquiring an amplitude response matrix of the channel transfer matrix includes:

acquiring the amplitude response matrix of the channel transfer matrix according to a channel transfer interference parameter, where the amplitude response matrix is an N×1 matrix, N indicates the number of columns of subcarrier sequences that are located in a same time domain, and N is an integer greater than 1; and the acquiring an amplitude response cycle of the channel transfer matrix according to the amplitude response matrix includes:

acquiring an abridged amplitude response matrix according to the amplitude response matrix;

acquiring, according to a difference between amplitude response values of every two adjacent rows in the abridged amplitude response matrix, slopes of turning segments of an amplitude response curve corresponding to the abridged amplitude response matrix; and acquiring the amplitude response cycle of the channel transfer matrix according to the slopes of the turning segments.

With reference to the third possible implementation manner of the first aspect, in a fourth possible implementation manner of the first aspect, the acquiring an abridged amplitude response matrix according to the amplitude response matrix includes:

transforming the N×1 matrix into a P×Q matrix, and obtaining a maximum amplitude response value of each column in the P×Q matrix and a sequence of a location that is of the maximum amplitude response value of each column and in the N×1 matrix, where P and Q are integers greater than 1, and a product of P and Q is equal to N; and acquiring the abridged amplitude response matrix according to the sequence of the location that is of the maximum amplitude response value of each column and in the N×1 matrix, where the abridged amplitude response matrix is an M×1 matrix, M<N, and M is an integer greater than 1.

With reference to the third or the fourth possible implementation manner of the first aspect, in a fifth possible implementation manner of the first aspect, the acquiring, according to a difference between amplitude response values of every two adjacent rows in the abridged amplitude response matrix, slopes of turning segments of an amplitude response curve corresponding to the abridged amplitude response matrix includes:

if a difference between a first amplitude response value and a second amplitude response value that are adjacent is greater than zero, and a difference between the second amplitude response value and a third amplitude response value that are adjacent is less than zero, determining a location that is of a falling inflection point corresponding to the second amplitude response value and in the amplitude response curve;

if the difference between the first amplitude response value and the second amplitude response value that are adjacent is less than zero, and the difference between the second amplitude response value and the third amplitude response value that are adjacent is greater than zero, determining a location that is of a rising inflection point corresponding to the second amplitude response value and in the amplitude response curve; and acquiring, according to the falling inflection point, the rising inflection point, and start and end coordinates of the amplitude response curve, the slopes of the turning segments of the amplitude response curve corresponding to the abridged amplitude response matrix.

With reference to any one of the third to the fifth possible implementation manners of the first aspect, in a sixth possible implementation manner of the first aspect, the acquiring the amplitude response cycle of the channel transfer matrix according to the slopes of the turning segments includes:

extracting, from the slopes of the turning segments, a first turning segment slope that is greater than zero, and performing normalization processing on the first turning segment slope to acquire a first processed turning segment slope;

extracting, from the slopes of the turning segments, a second turning segment slope that is less than zero, and performing normalization processing on the second turning segment slope to acquire a second processed turning segment slope;

determining whether the first processed turning segment slope and the second processed turning segment slope are greater than a preset slope threshold, and determining the number of slope values, which are greater than the preset slope threshold, of the first processed turning segment slope and the second processed turning segment slope; and acquiring the amplitude response cycle of the channel transfer matrix according to the number of slope values.

With reference to the sixth possible implementation manner of the first aspect, in a seventh possible implementation manner of the first aspect, before the acquiring the amplitude response cycle of the channel transfer matrix according to the number of slope values, the method further includes:

determining amplitude ratios of projection lengths of the turning segments in an amplitude response direction to a preset amplitude response value; and the acquiring the amplitude response cycle of the channel transfer matrix according to the number of slope values includes:

acquiring the amplitude response cycle of the channel transfer matrix according to the amplitude ratio and the number of slope values.

With reference to any one of the second to the seventh possible implementation manners of the first aspect, in an eighth possible implementation manner of the first aspect, the acquiring, according to the amplitude response cycle, the window length of the sliding window that is required for performing noise filtering on the channel transfer matrix includes:

acquiring a channel feature function of the channel transfer matrix according to the amplitude response cycle and a signal feature parameter; and acquiring, according to the channel feature function, the window length of the sliding window that is required for performing noise filtering on the channel transfer matrix.

According to a second aspect, an embodiment of the present invention provides a channel equalization apparatus, including:

a channel transfer matrix acquiring module, configured to acquire a channel transfer matrix according to a training sequence sent by a transmit end;

an amplitude response matrix acquiring module, configured to acquire an amplitude response matrix of the channel transfer matrix;

a window determining module, configured to acquire, according to the amplitude response matrix, a window length of a sliding window that is required for performing noise filtering on the channel transfer matrix; and an equalization module, configured to perform noise filtering on the channel transfer matrix according to the window length of the sliding window, and perform, according to a channel transfer matrix that is obtained by means of noise filtering, channel equalization on a data payload sent by the transmit end.

With reference to the second aspect, in a first possible implementation manner of the second aspect, the apparatus further includes:

a noise prefiltering module, configured to perform, according to a preset window length of a noise prefiltering sliding window, noise prefiltering processing on the channel transfer matrix, and acquire a channel transfer matrix that is obtained by means of noise prefiltering processing; and the channel transfer matrix acquiring module is specifically configured to acquire an amplitude response matrix of the channel transfer matrix that is obtained by means of noise prefiltering processing.

With reference to the second aspect or the first possible implementation manner of the second aspect, in a second possible implementation manner of the second aspect, the window determining module includes:

an amplitude response cycle acquiring unit, configured to acquire an amplitude response cycle of the channel transfer matrix according to the amplitude response matrix; and a noise filtering sliding window determining unit, configured to acquire, according to the amplitude response cycle, the window length of the sliding window that is required for performing noise filtering on the channel transfer matrix.

With reference to the second possible implementation manner of the second aspect, in a third possible implementation manner of the second aspect, the amplitude response matrix acquiring module is specifically configured to:

acquire the amplitude response matrix of the channel transfer matrix according to a channel transfer interference parameter, where the amplitude response matrix is an N×1 matrix, N indicates the number of columns of subcarrier sequences that are located in a same time domain, and N is an integer greater than 1; and the amplitude response cycle acquiring unit includes:

an abridged amplitude response matrix acquiring subunit, configured to acquire an abridged amplitude response matrix according to the amplitude response matrix;

a slope acquiring subunit, configured to acquire, according to a difference between amplitude response values of every two adjacent rows in the abridged amplitude response matrix, slopes of turning segments of an amplitude response curve corresponding to the abridged amplitude response matrix; and an amplitude response cycle determining subunit, configured to acquire the amplitude response cycle of the channel transfer matrix according to the slopes of the turning segments.

With reference to the third possible implementation manner of the second aspect, in a fourth possible implementation manner of the second aspect, the abridged amplitude response matrix acquiring subunit is specifically configured to:

transform the N×1 matrix into a P×Q matrix, and obtain a maximum amplitude response value of each column in the P×Q matrix and a sequence of a location that is of the maximum amplitude response value of each column and in the N×1 matrix, where P and Q are integers greater than 1, and a product of P and Q is equal to N; and acquire the abridged amplitude response matrix according to the sequence of the location that is of the maximum amplitude response value of each column and in the N×1 matrix, where the abridged amplitude response matrix is an M×1 matrix, M<N, and M is an integer greater than 1.

With reference to the third or the fourth possible implementation manner of the second aspect, in a fifth possible implementation manner of the second aspect, the slope acquiring subunit is specifically configured to:

if a difference between a first amplitude response value and a second amplitude response value that are adjacent is greater than zero, and a difference between the second amplitude response value and a third amplitude response value that are adjacent is less than zero, determine a location that is of a falling inflection point corresponding to the second amplitude response value and in the amplitude response curve;

if the difference between the first amplitude response value and the second amplitude response value that are adjacent is less than zero, and the difference between the second amplitude response value and the third amplitude response value that are adjacent is greater than zero, determine a location that is of a rising inflection point corresponding to the second amplitude response value and in the amplitude response curve; and acquire, according to the falling inflection point, the rising inflection point, and start and end coordinates of the amplitude response curve, the slopes of the turning segments of the amplitude response curve corresponding to the abridged amplitude response matrix.

With reference to any one of the third to the fifth possible implementation manners of the second aspect, in a sixth possible implementation manner of the second aspect, the amplitude response cycle determining subunit is specifically configured to:

extract, from the slopes of the turning segments, a first turning segment slope that is greater than zero, and perform normalization processing on the first turning segment slope to acquire a first processed turning segment slope;

extract, from the slopes of the turning segments, a second turning segment slope that is less than zero, and perform normalization processing on the second turning segment slope to acquire a second processed turning segment slope;

determine whether the first processed turning segment slope and the second processed turning segment slope are greater than a preset slope threshold, and determine the number of slope values, which are greater than the preset slope threshold, of the first processed turning segment slope and the second processed turning segment slope; and acquire the amplitude response cycle of the channel transfer matrix according to the number of slope values.

With reference to the sixth possible implementation manner of the second aspect, in a seventh possible implementation manner of the second aspect, the apparatus further includes:

an amplitude ratio determining module, configured to determine amplitude ratios of projection lengths of the turning segments in an amplitude response direction to a preset amplitude response value; and the amplitude response cycle determining subunit is further specifically configured to acquire the amplitude response cycle of the channel transfer matrix according to the amplitude ratio and the number of slope values.

With reference to any one of the second to the seventh possible implementation manners of the second aspect, in an eighth possible implementation manner of the second aspect, the noise filtering sliding window determining unit includes:

a function determining subunit, configured to acquire a channel feature function of the channel transfer matrix according to the amplitude response cycle and a signal feature parameter; and a window determining subunit, configured to acquire, according to the channel feature function, the window length of the sliding window that is required for performing noise filtering on the channel transfer matrix.

According to a third aspect, an embodiment of the present invention provides a receiver, including the channel equalization apparatus according to the second aspect and any one of the first to the eighth possible implementation manners of the second aspect, where the channel equalization apparatus is connected to an analog to digital converter in the receiver.

The channel equalization method and apparatus, and a receiver are provided in the embodiments of the present invention. In the method, a channel transfer matrix is acquired according to a training sequence sent by a transmit end, and an amplitude response matrix of the channel transfer matrix is acquired; a window length of a sliding window that is required for performing noise filtering on the channel transfer matrix is acquired according to the amplitude response matrix; noise filtering is performed on the channel transfer matrix according to the window length of the sliding window; and channel equalization is performed on a received data payload according to a channel transfer matrix that is obtained by means of noise filtering, so that an optimal window length of a noise filtering sliding window is obtained according to the amplitude response matrix when channel equalization is performed in different network channel conditions, thereby automatically working in an optimal channel equalization mode, and implementing adaptive noise filtering processing and channel equalization.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
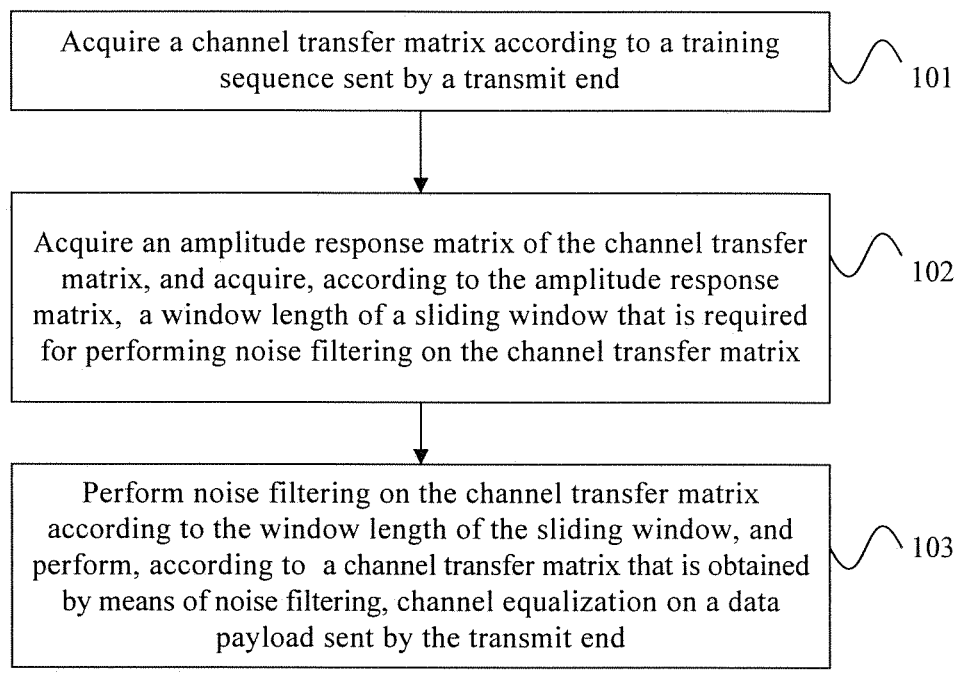
FIG. 1 is a flowchart of Embodiment 1 of a channel equalization method according to the present invention.

FIG. 1 is a flowchart of Embodiment 1 of a channel equalization method according to the present invention. The channel equalization method provided in the embodiment may be implemented by an apparatus executing the channel equalization method. The apparatus may be implemented by software and/or hardware, and the apparatus may specifically be a receive end with a receiver. As shown in FIG. 1, the method in the embodiment may include:

Step 101: Acquire a channel transfer matrix according to a training sequence sent by a transmit end.

Step 102: Acquire an amplitude response matrix of the channel transfer matrix, and acquire, according to the amplitude response matrix, a window length of a sliding window that is required for performing noise filtering on the channel transfer matrix.

Step 103: Perform noise filtering on the channel transfer matrix according to the window length of the sliding window, andperform, according to a channel transfer matrix that is obtained by means of noise filtering, channel equalization on a data payload sent by the transmit end.

Figure 2:
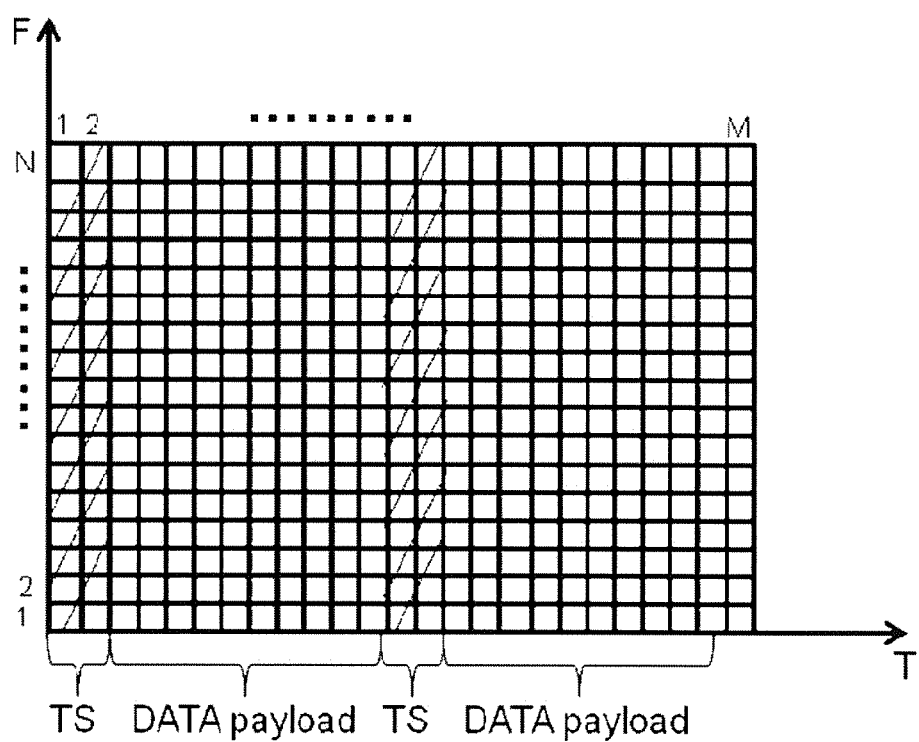
FIG. 2 is a schematic diagram of an OFDM data payload inserted with a known training sequence according to an embodiment of the present invention.

In a specific implementation process, the channel equalization method provided in the embodiment is implemented based on a training sequence. In step 101, a receive end receives a signal sent by the transmit end, and extracts a training sequence included in the signal, and acquires a channel transfer matrix according to the extracted training sequence and the training sequence sent by the transmit end. In a specific application process, the transmit end sends, to the receive end, information data of an OFDM data payload inserted with a known training sequence. A specific structure of the information data is shown in FIG. 2. In FIG. 2, a horizontal coordinate is a time axis (a time domain) of a signal, and represents a sequence of a training sequence or a sequence of an OFDM data payload; and a vertical coordinate is a frequency axis (a frequency domain) of the signal, and represents a subcarrier sequence of each training sequence or OFDM data payload. In the embodiment, the number of inserted training sequence columns is 2. A person skilled in the art may understand that, in the specific implementation process, the number of training sequence columns inserted in an OFDM data payload (DATA payload) may be multiple, which is not particularly limited in the embodiment. When channel equalization processing is performed, the channel transfer matrix is first obtained based on the training sequence, and a specific process may be shown as follows:

The receive end receives the information data sent by the transmit end through a channel. The known training sequence is $$\begin{bmatrix} tx_{i,j} \\ ty_{i,j} \end{bmatrix} \begin{bmatrix} tx_{i+1,j} \\ ty_{i+1,j} \end{bmatrix},$$

and the training sequence received by the receive end is $$\begin{bmatrix} RX2\_TS_{i,j} \\ RY2\_TS_{i,j} \end{bmatrix} \begin{bmatrix} RX2\_TS_{i+1,j} \\ RY2\_TS_{i+1,j} \end{bmatrix},$$

where i represents a payload sequence, represents a subcarrier sequence of each payload, and i and i+1 may be corresponding to the training sequence (Training Sequence, TS for short) shown in columns 1 and 2 in FIG. 2.

Based on the known sequence and the training sequence received by the receive end, a 2×2 channel transfer matrix of each subcarrier is obtained according to principles of Fast Fourier Transform (Fast Fourier Transform, FFT for short) and Zero Forcing (Zero Forcing, ZF for short), and according to that a change between two continuous OFDM data payloads is negligible.

$$\begin{bmatrix} hxx_{i,j} & hyx_{i,j} \\ hxy_{i,j} & hyy_{i,j} \end{bmatrix} = \begin{bmatrix} hxx_{i+1,j} & hyx_{i+1,j} \\ hxy_{i+1,j} & hyy_{i+1,j} \end{bmatrix} \quad (1)$$

$$= \begin{bmatrix} \dfrac{RX2\_TS_{i+1,j} gty_{i,j} - RX2\_TS_{i,j} gty_{i+1,j}}{tx_{i,j} gty_{i+1,j} - tx_{i+1,j} gty_{i,j}} & \dfrac{RX2\_TS_{i,j} gtx_{i+1,j} - RX2\_TS_{i+1,j} gtx_{i,j}}{ty_{i,j} gtx_{i+1,j} - ty_{i+1,j} gtx_{i,j}} \\ \dfrac{RY2\_TS_{i+1,j} gty_{i,j} - RY2\_TS_{i,j} gty_{i+1,j}}{tx_{i,j} gty_{i+1,j} - tx_{i+1,j} gty_{i,j}} & \dfrac{RY2\_TS_{i,j} gtx_{i+1,j} - RY2\_TS_{i+1,j} gtx_{i,j}}{ty_{i,j} gtx_{i+1,j} - ty_{i+1,j} gtx_{i,j}} \end{bmatrix}$$

where $hxx_{i,j}$, $hxy_{i,j}$, $hyx_{i,j}$ and $hyyl_{i,j}$ represent channel transfer interference parameters, namely, estimated channel response values in channel estimation.

In a channel transmission process, xx can be construed as interference between signals in a single training sequence column, and xy can be construed as interference between signals in two training sequence columns. Other parameters are similar, and details are not repeatedly described in the embodiment.

A person skilled in the art may understand that the number of training sequence columns is at least two. When the number of training sequence columns is two, one 2×2 channel transfer matrix is obtained; and when the number of training sequence columns is multiple, multiple 2×2 channel transfer matrices are obtained. The number of training sequence columns is not particularly limited in the embodiment.

In step 102, the amplitude response matrix is acquired according to channel transfer interference parameters in the channel transfer matrix; an amplitude response cycle of the channel transfer matrix is acquired according to the amplitude response matrix; and then the window length of the sliding window that is required for performing noise filtering on the channel transfer matrix is acquired according to the amplitude response cycle. A person skilled in the art may understand that an amplitude response matrix is corresponding to an amplitude response curve, and in the amplitude response curve, a rising curve and a falling curve that are continuous represent one amplitude response cycle of the channel transfer matrix. A person skilled in the art may understand that a falling curve and a rising curve that are continuous also represent one amplitude response cycle of the channel transfer matrix. The amplitude response cycle further determines a channel feature function, and channel feature functions based on various channel features are obtained according to the amplitude response cycle. A channel feature may be a differential group delay (Differential Group Delay, DGD for short), another channel parameter, or the like, which is not particularly limited in the embodiment of the present invention. Then, the window length of the sliding window is obtained according to the channel feature function, where the window length is required for performing noise filtering on the channel transfer matrix.

In step 103, noise filtering is performed on the channel transfer matrix according to the window length, which is obtained in step 2, of the sliding window; and according to a channel transfer matrix that is obtained by means of noise filtering, channel equalization is performed on a received data payload, and compensation and recovery is performed on the data payload, so as to eliminate or reduce a problem of intersymbol interference caused by a multipath delay in wideband communication. A person skilled in the art may understand that, in the embodiment, channel equalization can be performed on the received data payload according to a channel transfer matrix that is obtained by means of noise filtering and by using various channel equalization methods in the prior art.

In the embodiment of the present invention, a channel transfer matrix is acquired according to a training sequence sent by a transmit end, and an amplitude response matrix of the channel transfer matrix is acquired; a window length of a sliding window that is required for performing noise filtering on the channel transfer matrix is acquired according to the amplitude response matrix; noise filtering is performed on the channel transfer matrix according to the window length of the sliding window; and channel equalization is performed on a received data payload according to a channel transfer matrix that is obtained by means of noise filtering, so that an optimal window length of a noise filtering sliding window is obtained according to the amplitude response matrix when channel equalization is performed in different network channel conditions, thereby automatically working in an optimal channel equalization mode, and implementing adaptive noise filtering processing and channel equalization.

On a basis of the embodiment of FIG. 1, optionally, before the acquiring an amplitude response matrix of the channel transfer matrix, the method further includes:

performing, according to a preset window length of a noise prefiltering sliding window, noise prefiltering processing on the channel transfer matrix, and acquiring a channel transfer matrix that is obtained by means of noise prefiltering processing; and correspondingly, the acquiring an amplitude response matrix of the channel transfer matrix includes:

acquiring an amplitude response matrix of the channel transfer matrix that is obtained by means of noise prefiltering processing.

In a noise prefiltering process, the window length of the sliding window may be preset, or may be any length of a noise filtering window, which is not particularly limited in the embodiment. Noise prefiltering processing on the channel transfer matrix can reduce impact of noise to some extent, and reduce a data processing volume of a receiver when the amplitude response matrix is acquired.

Figure 3:
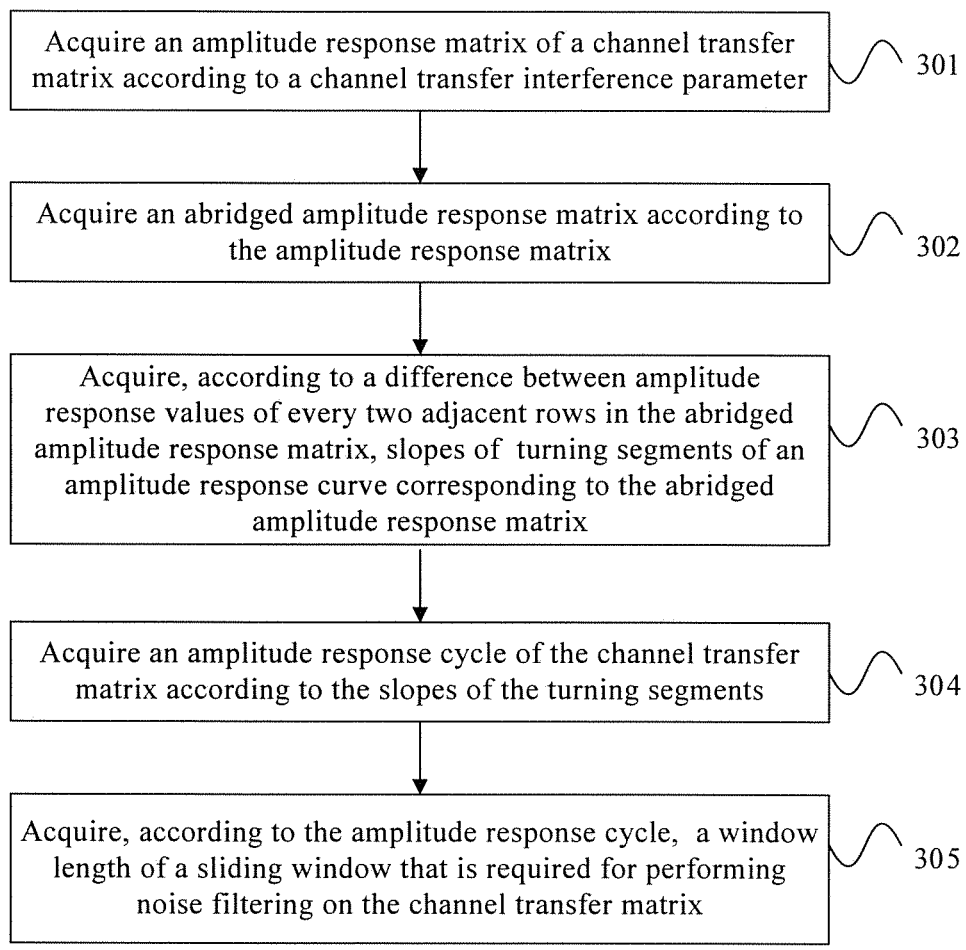
FIG. 3 is a flowchart of Embodiment 2 of a channel equalization method according to the present invention.

FIG. 3 is a flowchart of Embodiment 2 of a channel equalization method according to the present invention. On a basis of the embodiment shown in FIG. 1, the embodiment describes in detail step 102 shown in the embodiment of FIG. 1. As shown in FIG. 3, the channel equalization method of the embodiment includes:

Step 301: Acquire an amplitude response matrix of the channel transfer matrix according to a channel transfer interference parameter.

In the embodiment, $hxx_{i,j}$; is used as an example for a detailed description. For $hxy_{i,j}$, $hyx_{i,j}$ and $hyy_{i,j}$, reference may be made to $hxx_{i,j}$. A window length of a sliding window may be obtained according to any channel transfer interference parameter that is chosen, or may be a mean obtained according to multiple channel transfer interference parameters. Calculation may be performed on a carrier signal of a subcarrier sequence corresponding to each row of $hxx_{i,j}$ in the amplitude response matrix, to obtain an amplitude response value of the amplitude response matrix. In a specific implementation process, the carrier signal is a complex number, and a form corresponding to the carrier signal is a+bi, where a represents a real part, b represents an imaginary part, and the amplitude response value is $\sqrt{a^2+b^2}$. The amplitude response matrix is an N×1 matrix, where N indicates the number of columns of subcarrier sequences that are located in a same time domain, and N is an integer greater than 1 (reference may be made to FIG. 2).

Step 302: Acquire an abridged amplitude response matrix according to the amplitude response matrix.

In the specific implementation process, the N×1 matrix is first transformed into a P×Q matrix, and a maximum amplitude response value of each column in the P×Q matrix and a sequence of a location that is of the maximum amplitude response value of each column and in the N×1 matrix are obtained, where P and Q are integers greater than 1, and a product of P and Q is equal to N. For example, N=300, P=10, Q=30, a 300×1 matrix is transformed into a 10×30 matrix, that is, amplitude response values of the first 30 rows in the 300×1 matrix are determined to be the first row of the P×Q matrix, the amplitude response values from row 31 to row 60 in the 300×1 are determined to be the second row of the P×Q matrix, and so on, to obtain the 10×30 matrix. A person skilled in the art may understand that selection of P and N is not particularly limited in the embodiment, as long as a product of P and Q is equal to N. Then, the maximum amplitude response value of each column is selected, and 30 maximum amplitude response values can be finally obtained. A location sequence that is of the foregoing 30 maximum amplitude response values and in the N×1 matrix is obtained. A person skilled in the art may understand that, in an actual application process, a value of N is very large, and there are also multiple implementation manners of transforming the ×1 matrix into the P×Q matrix, which is not particularly limited in the embodiment.

After obtaining the maximum amplitude response value of each column in the P×Q matrix and the location sequence that is of the maximum amplitude response value of each column and in the N×1 matrix, the abridged amplitude response matrix is acquired according to the sequence of the location that is of the maximum amplitude response value of each column and in the N×1 matrix. That is, a location sequence of each amplitude response value in the abridged amplitude response matrix is the same as that in the N×1 matrix. The abridged amplitude response matrix is an M×1 matrix, where M<N and M is an integer greater than 1.

A person skilled in the art may understand that, in the specific implementation process, some value points that are close or have a relatively large error may be filtered out by acquiring the abridged amplitude response matrix, so as to reduce a subsequent data processing volume of a receiver.

Step 303: Acquire, according to a difference between amplitude response values of every two adjacent rows in the abridged amplitude response matrix, slopes of turning segments of an amplitude response curve corresponding to the abridged amplitude response matrix.

Figure 4:
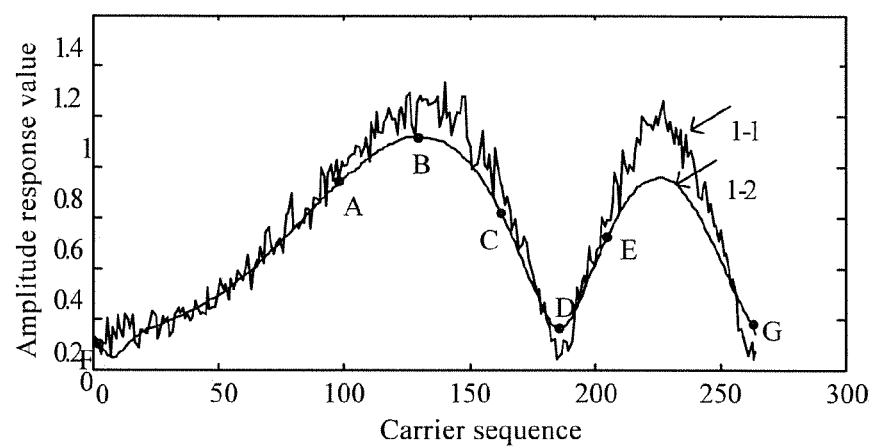
FIG. 4 is a schematic diagram of an amplitude response curve according to an embodiment of the present invention.

In the specific implementation process, the abridged amplitude response matrix is corresponding to an amplitude response curve, that is, a processed amplitude response curve may be obtained according to an amplitude response value in the abridged amplitude response matrix. Specifically as shown in FIG. 4, in FIG. 4, 1-1 represents an unprocessed amplitude response curve corresponding to the amplitude response matrix, and 1-2 represents a processed amplitude response curve corresponding to the abridged amplitude response matrix.

The slope of each turning segment of the amplitude response curve may be acquired according to the difference between the amplitude response values of every two adjacent rows in the abridged amplitude response matrix. A specific implementation process is as follows:

if a difference between a first amplitude response first amplitude response value and a second amplitude response value that are adjacent is greater than zero, and a difference between the second amplitude response second amplitude response value and a third amplitude response value that are adjacent is less than zero, a location that is of a rising inflection point and falling inflection point corresponding to the second amplitude response second amplitude response value and in the amplitude response curve is determined. As shown in FIG. 4, B−A>0, C−B<0, and B is corresponding to the location of the falling inflection point in the amplitude response curve.

if the difference between the first amplitude response value and the second amplitude response value that are adjacent is less than zero, and the difference between the second amplitude response value and the third amplitude response value that are adjacent is greater than zero, a location that is of a rising inflection point corresponding to the second amplitude response value and in the amplitude response curve is determined. As shown in FIG. 4, D−C<0, E−D>0, and f1 is corresponding to the location of the rising inflection point in the amplitude response curve.

Then, the slopes of the turning segments of the amplitude response curve corresponding to the abridged amplitude response matrix is acquired according to the falling inflection point, the rising inflection point, and start and end coordinates of the amplitude response curve. That is, the slopes of the turning segments of the amplitude response curve are obtained according to coordinates corresponding to F, B, D, G, and H, which are shown in FIG. 4.

Step 304: Acquire an amplitude response cycle of the channel transfer matrix according to the slopes of the turning segments.

A person skilled in the art may understand that, in FIG. 4, a slope corresponding to a rising curve is greater than zero, and a slope corresponding to a falling curve is less than zero. After the slopes of the turning segments are obtained, a first turning segment slope greater than zero is extracted from the slopes of the turning segments, and normalization processing is performed on the first turning segment slope to acquire a first processed turning segment slope; and a second turning segment slope less than zero is extracted from the slopes of the turning segments, and normalization processing is performed on the second turning segment slope to acquire a second processed turning segment slope.

A person skilled in the art may understand when a slope is greater than zero, normalization processing may be dividing the first turning segment slope greater than zero by a maximum value of the first turning segment slope to obtain the first processed turning segment slope. When a slope is less than zero, normalization processing may be dividing the second turning segment slope less than zero by a minimum value of the second turning segment slope to obtain the second processed turning segment slope. Both the first processed turning segment slope and the second processed turning segment slope are greater than zero.

Then, it is determined whether the first processed turning segment slope and the second processed turning segment slope are greater than a preset slope threshold, and the number of slope values, which are greater than the preset slope threshold, of the first processed turning segment slope and the second processed turning segment slope is determined. Particularly, only when the first processed turning segment slope and the second processed turning segment slope are greater than the preset slope threshold, an amplitude response cycle feature of the amplitude response curve is relatively obvious. In this case, the number of the slope values, which are greater than the preset slope threshold, of the first processed turning segment slope and the second processed turning segment slope is then determined.

Finally, the amplitude response cycle of the channel transfer matrix is acquired according to the number of slope values. An amplitude response cycle includes a rising curve and a falling curve, and the amplitude response cycle T_xx equals a product obtained by multiplying the total number of slope values of the first processed turning segment slope and the second processed turning segment slope by 0.5.

In the embodiment, comparison with a preset slope threshold is performed, so that impact of some relatively flat curves on an amplitude response cycle can be eliminated, and an amplitude response cycle, which is finally acquired according to the number of slope values, of a channel transfer matrix is more accurate.

A person skilled in the art may understand when there is an H point shown in FIG. 4, in order to acquire more accurately an amplitude response cycle corresponding to a GH turning segment, an amplitude ratio of a projection length of the turning segment in an amplitude response direction to a preset amplitude response value may further be first determined.

In the specific implementation process, the preset amplitude response value may be preset according to an empirical value, or may be a mean of projection lengths of all turning segments in the amplitude response direction. The amplitude response direction is a direction shown by a vertical coordinate in FIG. 4. When an amplitude ratio of a projection length of a turning segment in the amplitude response direction to the preset amplitude response value is less than ½, it indicates that a cycle corresponding to the turning segment is less than 0.5. In this case, the amplitude response cycle of the channel transfer matrix needs to be acquired according to the amplitude ratio and the number of slope values. In the specific application process, an amplitude response cycle corresponding to points F to G may be first acquired according to the number of slope values of turning segments between points F and G. Then, the amplitude response cycle corresponding to the GH turning segment is acquired according to the amplitude ratio of the projection length of the GH turning segment in the amplitude response direction to the preset amplitude response value. For example, if an amplitude ratio is ⅓, a corresponding amplitude response cycle may be 0.5×⅓, and a final amplitude response cycle T_xx=4×0.5+0.5×⅓.

In the embodiment, the amplitude ratio of the projection length of each turning segment in an amplitude response direction to the preset amplitude response value is determined, the amplitude response cycle of the channel transfer matrix is acquired according to the amplitude ratio and the number of slope values. For an amplitude response curve without complete rising and falling curves, an accurate amplitude response cycle may be acquired according to the amplitude ratio, thereby enhancing accuracy of the amplitude response cycle.

Step 305: Acquire, according to the amplitude response cycle, a window length of a sliding window that is required for performing noise filtering on the channel transfer matrix.

In a specific implementation process of step 305, two steps are specifically included:

One step is: acquiring a channel feature function of the channel transfer matrix according to the amplitude response cycle and a signal feature parameter.

The signal feature parameter includes: a baud rate, an FFT size, and a valid subcarrier. The signal feature parameter may be a system parameter that is acquired by the receiver when the receiver receives a data payload. A channel feature function based on a DGD may be acquired according to formula (2) shown in the following:

$$DGD \text{ value}=T\_xx/(\text{baud rate/FFT size}\times(\text{valid subcarrier}))\times 1e12 \qquad (2)$$

where the baud rate represents the number of times that a carrier parameter changes in a unit time, the FFT size represents the number of frequencies of a frequency domain, and the valid subcarrier represents the number of subcarriers required for an actual signal bearing rate.

The other step is: acquiring, according to the channel feature function, the window length of the sliding window that is required for noise filtering on the channel transfer matrix.

Configuration parameters of the sliding window include: a DGD value, a baud rate, and an FFT size. The configuration parameters of the sliding window may be system parameters that are acquired by the receiver when the receiver receives a data payload. The window length, which is required for noise filtering, of the sliding window may be acquired according to formula (3).

$$\text{Window length } m=0.1/(DGD \text{ value}\times 1e-12\times \text{baud rate/FFT size})) \qquad (3)$$

where the baud rate represents the number of times that a carrier parameter changes in a unit time, and the FFT size represents the number of frequencies of a frequency domain.

Finally, the window length, which is required for adaptive noise filtering, of the sliding window is obtained. A person skilled in the art may understand that, in the embodiment, when noise filtering is performed according to the channel transfer matrix, the window length of the sliding window does not remain unchanged but is determined according to the channel transfer matrix, so that the receiver can automatically work in an optimal channel equalization mode, thereby implementing adaptive noise filtering and channel equalization.

Figure 5:
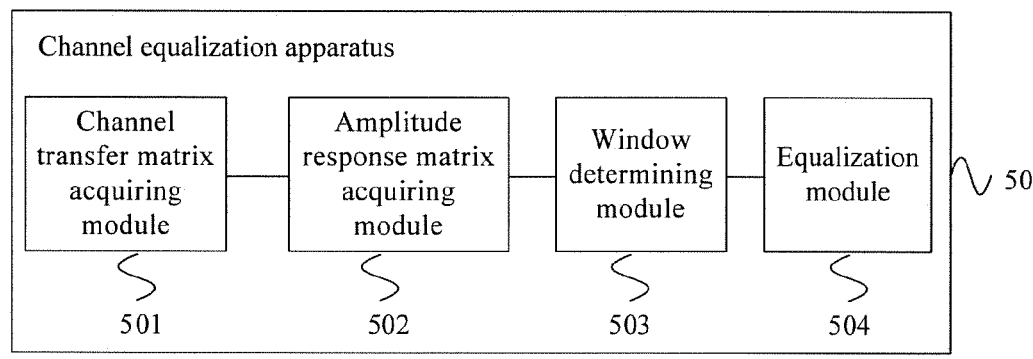
FIG. 5 is a schematic structural diagram of Embodiment 1 of a channel equalization apparatus according to the present invention.

FIG. 5 is a schematic structural diagram of Embodiment 1 of a channel equalization apparatus according to the present invention. As shown in FIG. 5, a channel equalization apparatus 50 provided in the embodiment of the present invention includes: a channel transfer matrix acquiring module 501, an amplitude response matrix acquiring module 502, a window determining module 503, and an equalization module 504.

The channel transfer matrix acquiring module 501 is configured to acquire a channel transfer matrix according to a training sequence sent by a transmit end.

The amplitude response matrix acquiring module 502 is configured to acquire an amplitude response matrix of the channel transfer matrix.

The window determining module 503 is configured to acquire, according to the amplitude response matrix, a window length of a sliding window that is required for performing noise filtering on the channel transfer matrix.

The equalization module 504 is configured to perform noise filtering on the channel transfer matrix according to the window length of the sliding window, and perform, according to a channel transfer matrix that is obtained by means of noise filtering, channel equalization on a data payload sent by the transmit end.

The channel equalization apparatus of the embodiment may be configured to execute the technical solutions shown in FIG. 1, where implementation principles and technical effects of the channel equalization apparatus are similar, and details are not repeatedly described herein.

Figure 6:
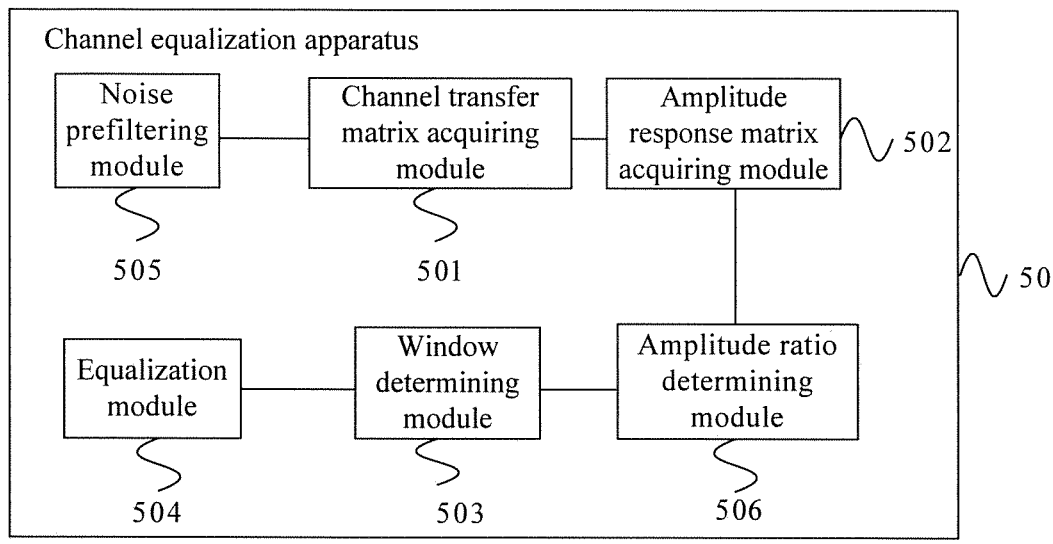
FIG. 6 is a schematic structural diagram of Embodiment 2 of a channel equalization apparatus according to the present invention.

FIG. 6 is a schematic structural diagram of Embodiment 2 of a channel equalization apparatus according to the present invention. As shown in FIG. 6, on a basis of the embodiment shown in FIG. 5, a channel equalization apparatus 50 provided in the embodiment further includes: a noise prefiltering module 505, configured to perform, according to a preset window length of a noise prefiltering sliding window, noise prefiltering processing on a channel transfer matrix, and acquire a channel transfer matrix that is obtained by means of noise prefiltering processing.

Optionally, the channel transfer matrix acquiring module 501 is specifically configured to acquire the amplitude response matrix of the channel transfer matrix that is obtained by means of noise prefiltering processing.

The window determining module 503 includes:

an amplitude response cycle acquiring unit, configured to acquire an amplitude response cycle of the channel transfer matrix according to the amplitude response matrix; and a noise filtering sliding window determining unit, configured to acquire, according to the amplitude response cycle, the window length of the sliding window that is required for performing noise filtering on the channel transfer matrix.

Optionally, the amplitude response matrix acquiring module 502 is specifically configured to:

acquire the amplitude response matrix of the channel transfer matrix according to a channel transfer interference parameter, where the amplitude response matrix is an N×1 matrix, N indicates the number of columns of subcarrier sequences that are located in a same time domain, and N is an integer greater than 1; and the amplitude response cycle acquiring unit includes:

an abridged amplitude response matrix acquiring subunit, configured to acquire an abridged amplitude response matrix according to the amplitude response matrix;

a slope acquiring subunit, configured to acquire, according to a difference between amplitude response values of every two adjacent rows in the abridged amplitude response matrix, slopes of turning segments of an amplitude response curve corresponding to the abridged amplitude response matrix; and an amplitude response cycle determining subunit, configured to acquire the amplitude response cycle of the channel transfer matrix according to the slopes of the turning segments.

Optionally, the abridged amplitude response matrix acquiring subunit is specifically configured to:

transform the N×1 matrix into a P×Q matrix, and obtain a maximum amplitude response value of each column in the P×Q matrix and a sequence of a location that is of the maximum amplitude response value of each column and in the N×1 matrix, where P and Q are integers greater than 1, and a product of P and Q is equal to N; and acquire the abridged amplitude response matrix according to the sequence of the location that is of the maximum amplitude response value of each column and in the N×1 matrix, where the abridged amplitude response matrix is an M×1 matrix, M<N, and M is an integer greater than 1.

Optionally, the slope acquiring subunit is specifically configured to:

if a difference between a first amplitude response value and a second amplitude response value that are adjacent is greater than zero, and a difference between the second amplitude response value and a third amplitude response value that are adjacent is less than zero, determine a location that is of a falling inflection point corresponding to the second amplitude response value and in the amplitude response curve;

if the difference between the first amplitude response value and the second amplitude response value that are adjacent is less than zero, and the difference between the second amplitude response value and the third amplitude response value that are adjacent is greater than zero, determine a location that is of a rising inflection point corresponding to the second amplitude response value and in the amplitude response curve; and acquire, according to the falling inflection point, the rising inflection point, and start and end coordinates of the amplitude response curve, the slopes of the turning segments of the amplitude response curve corresponding to the abridged amplitude response matrix.

Optionally, the amplitude response cycle determining subunit is specifically configured to:

extract, from the slopes of the turning segments, a first turning segment slope that is greater than zero, and perform normalization processing on the first turning segment slope to acquire a first processed turning segment slope;

extract, from the slopes of the turning segments, a second turning segment slope that is less than zero, and perform normalization processing on the second turning segment slope to acquire a second processed turning segment slope;

determine whether the first processed turning segment slope and the second processed turning segment slope are greater than a preset slope threshold, and determine the number of slope values, which are greater than the preset slope threshold, of the first processed turning segment slope and the second processed turning segment slope; and acquire the amplitude response cycle of the channel transfer matrix according to the number of slope values.

Optionally, the channel equalization apparatus 50 further includes:

an amplitude ratio determining module 506, configured to determine amplitude ratios of projection lengths of the turning segments in an amplitude response direction to a preset amplitude response value; and the amplitude response cycle determining subunit is further specifically configured to acquire the amplitude response cycle of the channel transfer matrix according to the amplitude ratio and the number of slope values.

Optionally, the noise filtering sliding window determining unit includes:

a function determining subunit, configured to acquire a channel feature function of the channel transfer matrix according to the amplitude response cycle and a signal feature parameter; and a window determining subunit, configured to acquire, according to the channel feature function, the window length of the sliding window that is required for performing noise filtering on the channel transfer matrix.

The channel equalization apparatus in the embodiment may be configured to execute the technical solutions in the foregoing methods, where implementation principles and technical effects of the channel equalization apparatus are similar, and details are not repeatedly described herein.

Figure 7:
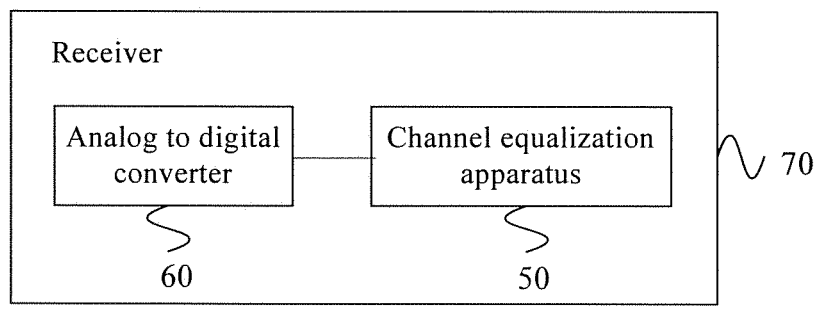
FIG. 7 is a schematic structural diagram of Embodiment 1 of a receiver according to the present invention.

FIG. 7 is a schematic structural diagram of Embodiment 1 of a receiver according to the present invention. As shown in FIG. 7, a receiver 70 provided in the embodiment includes a channel equalization apparatus 50 and an analog to digital converter 60. The channel equalization apparatus 50 is connected to the analog to digital converter 60. Particularly, the channel equalization apparatus 50 may use a structure of the channel equalization apparatus shown in FIG. 5 and FIG. 6.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A channel equalization method, comprising:
    acquiring a channel transfer matrix according to a training sequence sent by a transmit end;
    acquiring an amplitude response matrix of the channel transfer matrix, and acquiring, according to the amplitude response matrix, a window length of a sliding window that is required for performing noise filtering on the channel transfer matrix; and
    performing noise filtering on the channel transfer matrix according to the window length of the sliding window, and performing, according to a channel transfer matrix that is obtained by means of noise filtering, channel equalization on a data payload sent by the transmit end.

2. The method according to claim 1, wherein:
    before acquiring an amplitude response matrix of the channel transfer matrix, the method further comprises:
        performing, according to a preset window length of a noise prefiltering sliding window, noise prefiltering processing on the channel transfer matrix, and acquiring a channel transfer matrix that is obtained by means of noise prefiltering processing; and
    acquiring an amplitude response matrix of the channel transfer matrix comprises:
        acquiring an amplitude response matrix of the channel transfer matrix that is obtained by means of noise prefiltering processing.

3. The method according to claim 1, wherein acquiring, according to the amplitude response matrix, a window length of a sliding window that is required for performing noise filtering on the channel transfer matrix comprises:
    acquiring an amplitude response cycle of the channel transfer matrix according to the amplitude response matrix; and
    acquiring, according to the amplitude response cycle, the window length of the sliding window that is required for performing noise filtering on the channel transfer matrix.

4. The method according to claim 3, wherein
acquiring an amplitude response matrix of the channel transfer matrix comprises:
    acquiring the amplitude response matrix of the channel transfer matrix according to a channel transfer interference parameter, wherein the amplitude response matrix is an N×1 matrix, N indicates the number of columns of subcarrier sequences that are located in a same time domain, and N is an integer greater than 1; and
acquiring an amplitude response cycle of the channel transfer matrix according to the amplitude response matrix comprises:
    acquiring an abridged amplitude response matrix according to the amplitude response matrix,
    acquiring, according to a difference between amplitude response values of every two adjacent rows in the abridged amplitude response matrix, slopes of turning segments of an amplitude response curve corresponding to the abridged amplitude response matrix, and
    acquiring the amplitude response cycle of the channel transfer matrix according to the slopes of the turning segments.

5. The method according to claim 4, wherein acquiring an abridged amplitude response matrix according to the amplitude response matrix comprises:
    transforming the N×1 matrix into a P×Q matrix, and obtaining a maximum amplitude response value of each column in the P×Q matrix and a sequence of a location that is of the maximum amplitude response value of each column and in the N×1 matrix, wherein P and Q are integers greater than 1, and a product of P and Q is equal to N; and
    acquiring the abridged amplitude response matrix according to the sequence of the location that is of the maximum amplitude response value of each column and in the N×1 matrix, wherein the abridged amplitude response matrix is an M×1 matrix, M<N, and M is an integer greater than 1.

6. The method according to claim 4, wherein acquiring, according to a difference between amplitude response values of every two adjacent rows in the abridged amplitude response matrix, slopes of turning segments of an amplitude response curve corresponding to the abridged amplitude response matrix comprises:
    if a difference between a first amplitude response value and a second amplitude response value that are adjacent is greater than zero, and a difference between the second amplitude response value and a third amplitude response value that are adjacent is less than zero, determining a location that is of a falling inflection point corresponding to the second amplitude response value and in the amplitude response curve;
    if the difference between the first amplitude response value and the second amplitude response value that are adjacent is less than zero, and the difference between the second amplitude response value and the third amplitude response value that are adjacent is greater than zero, determining a location that is of a rising inflection point corresponding to the second amplitude response value and in the amplitude response curve; and acquiring, according to the falling inflection point, the rising inflection point, and start and end coordinates of the amplitude response curve, the slopes of the turning segments of the amplitude response curve corresponding to the abridged amplitude response matrix.

7. The method according to claim 4, wherein acquiring the amplitude response cycle of the channel transfer matrix according to the slopes of the turning segments comprises:

extracting, from the slopes of the turning segments, a first turning segment slope that is greater than zero, and performing normalization processing on the first turning segment slope to acquire a first processed turning segment slope;

extracting, from the slopes of the turning segments, a second turning segment slope that is less than zero, and performing normalization processing on the second turning segment slope to acquire a second processed turning segment slope;

determining whether the first processed turning segment slope and the second processed turning segment slope are greater than a preset slope threshold, and determining the number of slope values, which are greater than the preset slope threshold, of the first processed turning segment slope and the second processed turning segment slope; and acquiring the amplitude response cycle of the channel transfer matrix according to the number of slope values.

8. The method according to claim 7, wherein:

before acquiring the amplitude response cycle of the channel transfer matrix according to the number of slope values, the method further comprises:
determining amplitude ratios of projection lengths of the turning segments in an amplitude response direction to a preset amplitude response value; and acquiring the amplitude response cycle of the channel transfer matrix according to the number of slope values comprises:
acquiring the amplitude response cycle of the channel transfer matrix according to the amplitude ratios and the number of slope values.

9. The method according to claim 3, wherein acquiring, according to the amplitude response cycle, the window length of the sliding window that is required for performing noise filtering on the channel transfer matrix comprises:

acquiring a channel feature function of the channel transfer matrix according to the amplitude response cycle and a signal feature parameter; and acquiring, according to the channel feature function, the window length of the sliding window that is required for performing noise filtering on the channel transfer matrix.

10. A channel equalization apparatus, comprising:
a channel transfer matrix acquiring module, configured to acquire a channel transfer matrix according to a training sequence sent by a transmit end;
an amplitude response matrix acquiring module, configured to acquire an amplitude response matrix of the channel transfer matrix;

a window determining module, configured to acquire, according to the amplitude response matrix, a window length of a sliding window that is required for performing noise filtering on the channel transfer matrix; and an equalization module, configured to perform noise filtering on the channel transfer matrix according to the window length of the sliding window, and perform, according to a channel transfer matrix that is obtained by means of noise filtering, channel equalization on a data payload sent by the transmit end.

11. The apparatus according to claim 10, further comprising:

a noise prefiltering module, configured to perform, according to a preset window length of a noise prefiltering sliding window, noise prefiltering processing on the channel transfer matrix to acquire a channel transfer matrix that is obtained by means of noise prefiltering processing; and wherein the channel transfer matrix acquiring module is configured to acquire an amplitude response matrix of the channel transfer matrix that is obtained by means of noise prefiltering processing.

12. The apparatus according to claim 10, wherein the window determining module comprises:

an amplitude response cycle acquiring unit, configured to acquire an amplitude response cycle of the channel transfer matrix according to the amplitude response matrix; and a noise filtering sliding window determining unit, configured to acquire, according to the amplitude response cycle, the window length of the sliding window that is required for performing noise filtering on the channel transfer matrix.

13. The apparatus according to claim 12, wherein:
the amplitude response matrix acquiring module is configured to:
acquire the amplitude response matrix of the channel transfer matrix according to a channel transfer interference parameter, wherein the amplitude response matrix is an N×1 matrix, N indicates the number of columns of subcarrier sequences that are located in a same time domain, and N is an integer greater than 1; and the amplitude response cycle acquiring unit comprises:
an abridged amplitude response matrix acquiring subunit, configured to acquire an abridged amplitude response matrix according to the amplitude response matrix, a slope acquiring subunit, configured to acquire, according to a difference between amplitude response values of every two adjacent rows in the abridged amplitude response matrix, slopes of turning segments of an amplitude response curve corresponding to the abridged amplitude response matrix, and an amplitude response cycle determining subunit, configured to acquire the amplitude response cycle of the channel transfer matrix according to the slopes of the turning segments.

14. The apparatus according to claim 13, wherein the abridged amplitude response matrix acquiring subunit is configured to:

transform the N×1 matrix into a P×Q matrix, and obtain a maximum amplitude response value of each column in the P×Q matrix and a sequence of a location that is of the maximum amplitude response value of each column and in the N×1 matrix, wherein P and Q are integers greater than 1, and a product of P and Q is equal to N; and acquire the abridged amplitude response matrix according to the sequence of the sequence that is of the maximum amplitude response value of each column and in the N×1 matrix, wherein the abridged amplitude response matrix is an M×1 matrix, M<N, and M is an integer greater than 1.

15. The apparatus according to claim 13, wherein the slope acquiring subunit is configured to:

if a difference between a first amplitude response value and a second amplitude response value that are adjacent is greater than zero, and a difference between the second amplitude response value and a third amplitude response value that are adjacent is less than zero, determine a location that is of a falling inflection point corresponding to the second amplitude response value and in the amplitude response curve;

if the difference between the first amplitude response value and the second amplitude response value that are adjacent is less than zero, and the difference between the second amplitude response value and the third amplitude response value that are adjacent is greater than zero, determine a location that is of a rising inflection point corresponding to the second amplitude response value and in the amplitude response curve; and acquire, according to the falling inflection point, the rising inflection point, and start and end coordinates of the amplitude response curve, the slopes of turning segments of the amplitude response curve corresponding to the abridged amplitude response matrix.

16. The apparatus according to claim 13, wherein the amplitude response cycle determining subunit is configured to:

extract, from the slopes of the turning segments, a first turning segment slope that is greater than zero, and perform normalization processing on the first turning segment slope to acquire a first processed turning segment slope;

extract, from the slopes of the turning segments, a second turning segment slope that is less than zero, and perform normalization processing on the second turning segment slope to acquire a second processed turning segment slope;

determine whether the first processed turning segment slope and the second processed turning segment slope are greater than a preset slope threshold, and determine the number of slope values, which are greater than the preset slope threshold, of the first processed turning segment slope and the second processed turning segment slope; and acquire the amplitude response cycle of the channel transfer matrix according to the number of slope values.

17. The apparatus according to claim 16, further comprising:

an amplitude ratio determining module, configured to determine amplitude ratios of projection lengths of the turning segments in an amplitude response direction to a preset amplitude response value; and wherein the amplitude response cycle determining subunit is further configured to acquire the amplitude response cycle of the channel transfer matrix according to the amplitude ratio and the number of slope values.

18. The apparatus according to claim 12, wherein thenoise filtering sliding window determining unit comprises:

a function determining subunit, configured to acquire a channel feature function of the channel transfer matrix according to the amplitude response cycle and a signal feature parameter; and a window determining subunit, configured to acquire, according to the channel feature function, the window length of the sliding window that is required for performing noise filtering on the channel transfer matrix.

19. A receiver, comprising:

a channel equalization apparatus, comprising:

a channel transfer matrix acquiring module, configured to acquire a channel transfer matrix according to a training sequence sent by a transmit end, an amplitude response matrix acquiring module, configured to acquire an amplitude response matrix of the channel transfer matrix, a window determining module, configured to acquire, according to the amplitude response matrix, a window length of a sliding window that is required for performing noise filtering on the channel transfer matrix, and an equalization module, configured to perform noise filtering on the channel transfer matrix according to the window length of the sliding window, and perform, according to a channel transfer matrix that is obtained by means of noise filtering, channel equalization on a data payload sent by the transmit end; and an analog to digital converter coupled to the channel equalization apparatus.

* * * * *